United States Patent [19]
Yamanashi

[11] Patent Number: 5,312,026
[45] Date of Patent: May 17, 1994

[54] WELDED TUBE WITH EXCELLENT CORROSION-RESISTANT INNER SURFACE AND METHOD OF PRODUCING THE SAME

[76] Inventor: Hiroshi Yamanashi, 138-2, Naka, Mishima-shi, Shizuoka Prefecture, Japan

[21] Appl. No.: 984,628

[22] Filed: Dec. 2, 1992

[30] Foreign Application Priority Data

Dec. 2, 1991 [JP] Japan .................................. 3-343902

[51] Int. Cl.$^5$ .............................................. B21C 37/08
[52] U.S. Cl. .................................... 228/144; 228/203; 228/231; 148/521; 148/530
[58] Field of Search ............... 228/144, 146, 147, 203, 228/231; 219/59.1, 64; 148/518, 519, 521, 530, 533, 537

[56] References Cited

U.S. PATENT DOCUMENTS

| | | |
|---|---|---|
| 4,013,488 | 3/1977 | Ramquist et al. ................. 148/518 |
| 4,455,352 | 6/1984 | Ayres et al. ..................... 228/231 |
| 4,795,503 | 1/1989 | Takahashi et al. ................. 148/518 |

FOREIGN PATENT DOCUMENTS

| | | | |
|---|---|---|---|
| 97964 | 8/1978 | Japan ................................. | 228/144 |
| 136592 | 10/1980 | Japan ................................. | 228/144 |

*Primary Examiner*—Samuel M. Heinrich
*Attorney, Agent, or Firm*—Nikaido, Marmelstein, Murray et al.

[57] ABSTRACT

Disclosed is a welded tube with an excellent corrosion-resistant inner surface, in which the inner surface including the bead part has a first plate layer of one metal material selected from Sn, Sn—Zn, Sn—Ni, Ni—P and Ni—B and the first plate layer is overcoated with a second plate layer of one metal material selected from Ni, Co and alloys based on the metals. The welded tube is free from exposure of the steel base out of the plate layer and is also free from cracks, pin holes, overplated spots and peeling of the plate layer. It has excellent corrosion resistance and good workability for working the terminals. The welded tube is produced by forming a first plate layer of Sn, Sn—Zn, Sn—Ni, Ni—P or Ni—B on at least one surface of a steel strip, then forming a second plate layer of Ni, Co or an alloy based on the metals over the first plate layer, shaping the thus plated steel strip into a tube by welding with the plated surface being inside and then heat-treating the tube.

6 Claims, 1 Drawing Sheet

WELDED TUBE WITH EXCELLENT CORROSION-RESISTANT INNER SURFACE AND METHOD OF PRODUCING THE SAME

BACKGROUND OF THE INVENTION

1. Field of the Invention

The present invention relates to a welded with an excellent corrosion-resistant inner surface, in which the inner surface as plated with a metal or alloy has excellent corrosion resistance to be free from corrosion especially that from the welded part (hereinafter referred to as a bead part) and also to a method of producing the same.

2. Description of the Prior Art

Heretofore, a small-diameter steel tube has been used as a fuel pipe for cars. As pipes for lower gasoline, sour gasoline, alcohol and alcohol-mixed fuels, formation of an anti-rusting metal layer on the inner surface thereof for improving the rust resistance of it has been proposed. For instance, there has been used a welded steel tube with improved inner surface rusting resistance to be produced by a method in which at least one surface of a steel strip is plated with nickel by electric plating, the thus plated strip is formed into a tube by roll forming with the plated inner surface being inside, the butt joint area of the rolled tube is welded by electric resistance welding with electrode rolls or the like and the tube is finally annealed.

However, since the welded tube of the kind having a nickel plate layer on the inner surface thereof is produced by welding the butt joint area thereof by electric resistance welding or the like after the roll forming, the bead part to be formed on the inner surface of the tube often has discontinuous areas also in the nickel plate layer thereon to cause local exposure of the steel base out of the plate layer (see FIG. 2), or as the case may be, pin holes existing in the nickel plate layer in the part would often remain as they are. As a result, the part involves a problem that it would easily be corroded by water to be in alcohol or alcohol-mixed fuel or by organic acids to be formed by oxidation of gasoline or decomposition of alcohol.

SUMMARY OF THE INVENTION

The object of the present invention is to overcome the above-mentioned problem and to provide a welded tube in which the bead part thereof is well plated with a plate layer and the pin holes are also well coated with the layer to have not only excellent corrosion resistance but also excellent workability, for example, for working terminals of the tube, and also to provide a method of producing the welded tube.

The present inventors repeatedly studied so as to overcome the above-mentioned problem and to attain the above-mentioned object and have found that the object may be attained when a steel strip as coated with a plate layer of a low melting point single metal or alloy, such as Sn, Sn—Zn, Ni—P or the like, and then overcoated with another plate layer of at least one metal or metal alloy having a higher melting point than that of the metal or alloy of the previous plate layer, such as one selected from Ni, Co and alloys based on the metals, over the previous plate layer is used and formed into a tube. In the basis of the finding, they have completed the present invention. Therefore, the first embodiment of the present invention is a welded tube with an excellent corrosion-resistant inner surface, in which the inner surface including the bead part has been coated with a first plate layer made of at least one of Sn, Sn—Zn, Sn—Ni, Ni—P and Ni—B and the first plate layer preferably including the bead part has been overcoated with a second plate layer made of at least one of Ni, Co and alloys based on the metals. The second embodiment of the present invention is a method of producing a welded tube with an excellent corrosion-resistant inner surface, in which a first plate layer of at least one selected from Sn, Sn—Zn, Sn—Ni, Ni—P and Ni—B is formed on at least one surface of a steel strip, then a second plate layer of at least one selected from Ni, Co and alloys based on the metals is formed over the first plate layer, and the thus plated steel strip is formed into a tube with the plated surface being inside and heat-treated.

DETAILED DESCRIPTION OF THE INVENTION

Figure 1:
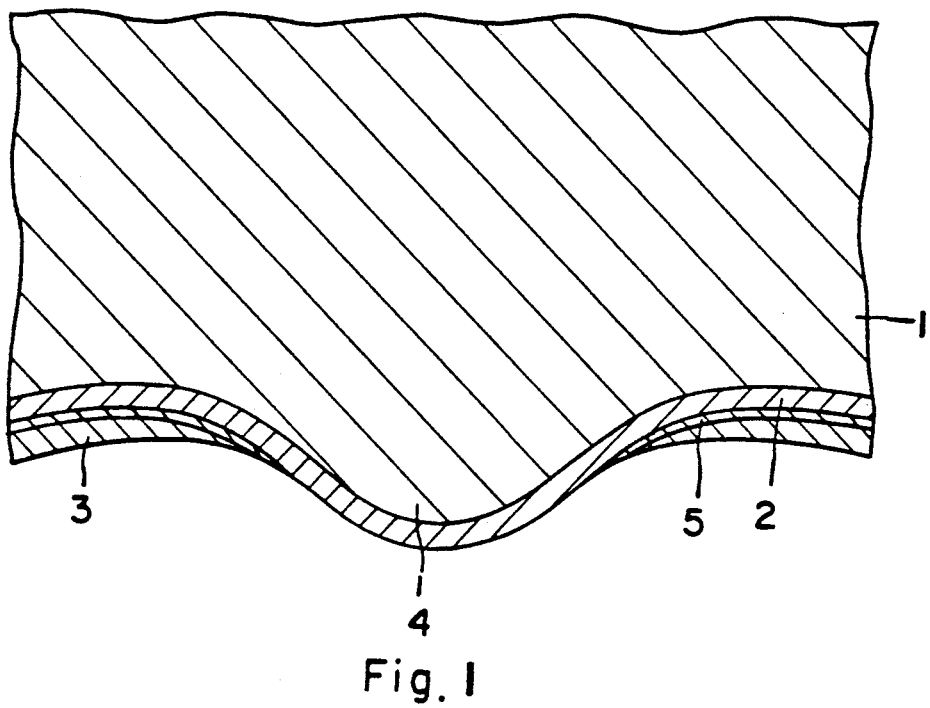
FIG. 1 is an enlarged cross-sectional view of showing one embodiment of a welded tube of the present invention, cut in the direction of the diameter of the tube.

The steel strip for use in the present invention may be anyone which is generally used as a material for fuel pipes for cars.

The first plate layer of a low melting point material is formed by electric or chemical plating of a single metal or alloy having a lower melting point than that of metals or alloys of forming the second plate layer, which will be mentioned below, and selected from the group consisting of Sn, Sn—Zn, Sn—Ni, Ni—P and Ni—B, and it preferably has a thickness of from 0.5 to 10 $\mu$m. If the thickness of the first plate layer is less than 0.5 $\mu$m, it would be difficult to fully compensate the failure of the second plate layer, which will be mentioned below, such as pin holes or cracks of the same and to fully cover the exposed area of the steel base due to the discontinuous plate cover in the bead area so that the corrosion resistance of the inner surface of the welded tube would be insufficient. On the contrary, if it is more than 10 $\mu$m, the plate layer would be cracked or peeled during the post-working such as bending or pressing of the welded tube, but rather the effect of the present invention would not be augmented so much despite of such thick plating.

The second plate layer is formed over the first plate layer by conventional electric or chemical steel plating to have a thickness of from 0.5 to 10 $\mu$m, using one selected from Ni, Co and alloys of them. If the thickness of the second plate layer is less than 0.5 $\mu$m, the intended corrosion resistance could not be attained. On the contrary, if it is more than 10 $\mu$m, the plate layer would be cracked and many steps are needed for the plating to be expensive with giving no further additional advantage.

The total thickness of the first layer and the second layer is desired to fall within the range of from 1 to 15 $\mu$m. If it is less than 1 $\mu$m, the corrosion resistance would be insufficient. On the contrary, if it is more than 15 $\mu$m, the plate layer would be cracked or peeled during the post-working such as bending or pressing of the welded tube.

Formation of the thus plated steel strip into a welded tube may be effected by any conventional process, for example, comprising cutting the strip into a desired size, roll-forming it into a tube with the plated surface being inside, welding the butt joint area to a welded tube and heat-treating the tube.

The last heat treatment is effected in order that the first plate layer is fused to be fluid to thereby compensate the failure of the second plate layer and also cover the bead part therewith with additionally removing the thermal influence of the previous welding on the welded tube. Therefore, it is preferably effected at a temperature falling within the range between the melting point of the single metal or alloy of the first plate layer and 1200° C. for a period of from 5 seconds to 15 minutes. If the temperature is lower than the melting point, the first plate layer could not be fused to be fluid so that the failure of the second plate layer could not well be compensated and the bead part could not well be covered therewith. On the contrary, if it is higher than 1200° C., the steel base material would be heat-deteriorated due to the growth of the crystal grains to coarse grains. More preferably, the heat treatment is effected at 600° C., since the thermal influence by welding may well be removed and the interdiffusion between the first plate layer and the second plate layer may further be promoted. If the time for the heat treatment is less than 5 seconds, fusion and fluidization of the first plate layer would be insufficient so that the failure of the second plate layer could not well be compensated and the bead part could not well be covered therewith. In addition, removal of the thermal influence by welding would be insufficient. On the contrary, if it is more than 15 minutes, the steel base material would be heat-deteriorated due to the growth of the crystal grains to coarse grains and additionally, the producibility would lower. More preferably, the heat treatment is effected at a temperature falling within the range of from 800° to 1200° C. for a period of from 10 seconds to 5 minutes.

Specifically, in accordance with the present invention, at least one surface of a steel strip is plated with a first plate layer of Sn or the like, having a determined thickness, by an ordinary plating method, then a second plate layer such as a nickel plate layer or the like, having a determined thickness, is formed thereover, then the two-layer plated steel strip is cut into a desired width and formed into a tube by an ordinary roll-filming method with the plated surface being inside, the but joint area of the tube is welded by an ordinary electric resistance welding method or high frequency welding method to form a welded tube, and thereafter the welded tube is heat-treated by the use of an atmospheric furnace or a high frequency heating furnace to produce a welded tube having an excellent corrosion-resistant inner surface. In this way, the above-mentioned problem has been overcome by the present invention.

In general, in the process of producing the welded tube of the kind, the bead part to be formed in the butt joint area by electric resistance welding or high frequency welding is often to involve local failure of the plate layer as formed thereon. In accordance with the method of the present invention, however, the inner first plate layer of Sn or the like having a lower melting point than the material of the outer second plate layer is fused to be fluid due to the heat treatment to be effected after welding of the plated strip whereby the fused and fluid material of the first plate layer is to spread around the bead part due to the capillary phenomenon or the like to additionally form a low melting point plate layer of Sn or the like around the part. In addition, even though the second plate layer of Ni or the like has pin holes or cracks, the low melting point plate layer of the first plate layer is also fused to be fluid due to the heat treatment to well fill them because of the same reason as above. Therefore, the inner surface of the welded tube of the present invention is coated with the first plate layer of Sn or the like and is further overcoated with the second plate layer of a metal or alloy having a higher melting point than the metal or alloy of the first plate layer, while the interface between the first plate layer and the second plate layer has a diffusion phase of the two layers. As a result, at least the bead part, pin holes and cracks are coated and filled with the fused low melting point metal layer. In this way, the inner surface of the welded tube of the present invention is free from exposure of the steel base out of the plate layer and is therefore resistant to lower gasoline, sour gasoline, alcohol, water to be contained in alcohol-mixed fuel and organic acids due to the barrier protection by the plate layer well formed on the inner surface of the tube.

The present invention will be explained in more detail by way of the following examples, which, however, are not intended to restrict the scope of the present invention.

EXAMPLE 1

As shown in FIG. 1, a first Ni—P plate layer 2 was formed on a steel strip (JIS G 3141 SPCC) 1 by chemical plating to have a thickness of 3 μm. Next, a second Ni plate layer 3 was formed over the Ni—P plate layer by electric plating, using a known Watt plating bath, to have a thickness of 3 μm. The total thickness of the first plate layer and the second plate layer was thus 6 μm.

The thus two-layer plated steel strip was cut into an open width of a tube to be formed and shaped into a tube by a known roll-forming method, and the butt joint part of the tube was welded by electric resistance welding to form a welded tube having an outer diameter of 8 mm. This was heat-treated at 1000° C. for 15 seconds. The welded tube thus obtained was divided into two in the direction of the axis of the tube, and one test piece thus cut was masked except the area to be tested and was subjected to a salt spray test on the basis of JIS Z 2371. As a result, no red rust formed on the inner surface of the test piece of the tube even after 96 hours. Thus, the tube was admitted to have excellent corrosion resistance. By microscopic observation, it was confirmed that the first plate layer 2 was formed also on the bead part 4 and that the interface between the first plate layer 2 and the second plate layer 3 had a diffusion phase 5. In addition, the welded tube sample was subjected to a bending test of bending it to 180 degrees at a radius of 20 mm with a grooved roll and to a press working test of pressing the terminals of it for evaluation of the workability thereof, whereupon the plate layer neither cracked nor peeled.

EXAMPLE 2

A first Sn plate layer was formed on a steel strip of the same kind as that used in Example 1 by electric plating using a known sulfuric acid bath, to have a thickness of 3 μm; and thereafter a second Ni plate layer was formed thereon by the same electric plating as that in Example 1 to have a thickness of 5 μm, the total thickness of the first plate layer and the second plate layer being 8 μm. The thus two-layer plated steel strip was formed into a tube in the same manner as in Example 1 and then heat-treated at 300° C. for 10 seconds to produce a welded tube.

This was subjected to the same salt spray test as in Example 1, whereupon no rust formed even after 72 hours. By microscopic observation of the cross section of the bead part of the tube, it was confirmed that the first plate layer wholly covered the bead part and that the interface between the first plate layer and the second plate layer had a diffusion phase of the two layers. By the same bending test and evaluation test as in Example 1, the plate layer neither cracked nor peeled.

EXAMPLE 3

A first Sn—Zn plate layer was formed on a steel strip of the same kind as that used in Example 1 by electric plating using a plating liquid of SZ-240 (produced by Dipsole Co.) to have a thickness of 0.5 μm. Then, a second Ni—Co plate layer was formed over the first plate layer by electric plating using a plating bath comprising 260 g/liter of $NiCl_2.6H_2O$, 14 g/liter of $CoCl_2.6H_2O$ and 15 g/liter of $H_3BO_3$, to have a thickness of 0.5 μm, the total thickness of the first plate layer and the second plate layer being 1 μm. The thus two-layer plated steel strip was formed into a tube in the same manner as in Example 1 and then heat-treated at 1000° C. for 1 minute to produce a welded tube.

This was subjected to the same salt spray test as in Example 1, whereupon no rust formed even after 48 hours. By microscopic observation of the cross section of the bead part of the tube, it was confirmed that the first plate layer wholly covered the part. By the same bending test and evaluation test as in Example 1, the plate layer neither cracked nor peeled.

EXAMPLE 4

A first Sn—Ni plate layer was formed on a steel strip of the same kind as that used in Example 1 by electric plating using a plating bath comprising 28 g/liter of $SnCl_2.6H_2O$, 30 g/liter of $NiCl_2.6H_2O$, 200 g/liter of $K_4P_2O_7$, 20 g/liter of glycine and 5 ml/liter of concentrated aqueous ammonia, to have a thickness of 0.5 μm. Then, a second Co plate layer was formed over the first plate layer by chemical plating using a plating bath comprising 22 g/liter of $CoCl_2.7H_2O$, 105 g/liter of $N_2H_5Cl_2$ and 90 g/liter of $C_4H_4O_6Na_2.2H_2O$, to have a thickness of 8 μm, the total thickness of the first layer and the second layer being 8.5 μm. The thus two-layer plated steel strip was formed into a tube in the same manner as in Example 1 and then heat-treated at 1130° C. for 30 seconds to produce a welded tube.

This was subjected to the same salt spray test as in Example 1, whereupon no rust formed even after 48 hours. By microscopic observation of the cross section of the bead part of the tube, it was confirmed that the first plate layer wholly covered the part. By the same bending test and evaluation test as in Example 1, the plate layer neither cracked nor peeled.

EXAMPLE 5

A first Ni plate layer was formed on a steel strip of the same kind as that used in Example 1 by chemical plating to have a thickness of 5 μm, and a second Ni plate layer was formed thereover by the same electric plating as in Example 1 to have a thickness of 0.5 μm, the total thickness of the first plate layer and the second plate layer being 5.5 μm. The thus two-layer plated steel strip was formed into a tube in the same manner as in Example 1 and then heat-treated at 1200° C. for 3 minutes to produce a welded tube.

This was subjected to the same salt spray test as in Example 1, whereupon no rust formed even after 72 hours. By microscopic observation of the cross section of the bead part of the tube, it was confirmed that the first plate layer wholly covered the part and that the interface between the first plate layer and the second plate layer had a diffusion phase of the two layers. By the same bending test and evaluation test as in Example 1, the plate layer neither cracked nor peeled.

EXAMPLE 6

A first Ni—P plate layer was formed on a steel strip of the same kind as that used in Example 1 by the same chemical plating as in Example 1 to have a thickness of 5 μm, and then a second Ni—B plate layer was formed thereover by the same chemical plating as in Example 3 for the first layer plating to have a thickness of 4 μm, the total thickness of the first plate layer and the second plate layer being 9 μm. The thus two-layer plated steel strip was formed into a tube in the same manner as in Example 1 and then heat-treated at 900° C. for 30 seconds to produce a welded tube.

This was subjected to the same salt spray test as in Example 1, whereupon no rust formed even after 72 hours. By microscopic observation of the cross section of the bead part of the tube, it was confirmed that the first plate layer wholly covered the part. By the same bending test and evaluation test as in Example 1, the plate layer neither cracked nor peeled.

COMPARATIVE EXAMPLE 1

Figure 2:
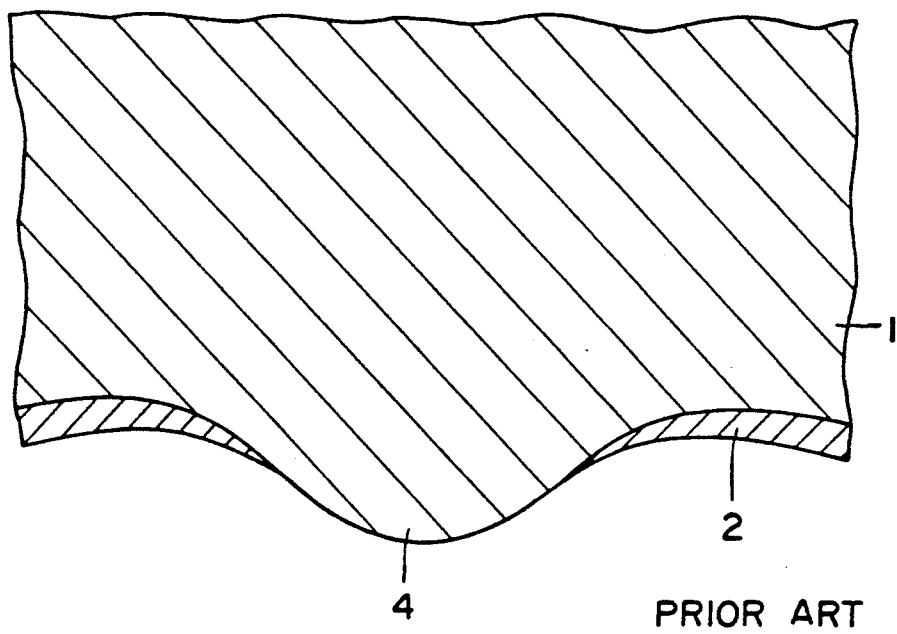
FIG. 2 is an enlarged cross-sectional view of showing one example of a conventional welded tube, cut in the same manner as in FIG. 1.

Only an Ni plate layer of 3 μm thick, which is the same one as the second plate layer 2 of Example 1, was formed on a steel strip of the same kind as that used in Example 1, as in FIG. 2. The thus plated strip was formed into a tube in the same manner as in Example 1 and then heat-treated at 900° C. for 30 minutes to produce a welded tube.

This was subjected to the same salt spray test as in Example 1, whereupon the bead part 4 rusted in 0.5 hour. By microscopic observation of the cross section of the bead part of the tube, it was confirmed that the Ni plate layer was not fully on the part.

COMPARATIVE EXAMPLE 2

A first Sn plate layer was formed on a steel strip of the same kind as that used in Example 1 by the same electric plating as in Example 2 to have a thickness of 0.2 μm, and a second Ni plate layer was formed thereover by the same electric plating as in Example 1 for the second plating to have a thickness of 15 μm, the total thickness of the first plate layer and the second plate layer being 15.2 μm. The thus two-layer plated strip was formed into a tube in the same manner as in Example 1 and then heat-treated at 300° C. for one minute to produce a welded tube.

This was subjected to the same salt spray test as in Example 1, whereupon no rust formed even after 24 hours. However, as a result of the bending test and evaluation test as applied to the tube, the plate layer peeled off. From this, it is understood that when the total thickness of the first plate layer and the second plate layer to be formed on the inner surface of the welded tube is over the uppermost limit of the range of from 1 μm to 15 μm, the tube is no more practicable and is not economical because of the high cost of the raw materials to be used.

COMPARATIVE EXAMPLE 3

A first Ni—B plate layer was formed on a steel strip of the same kind as that used in Example 1 by the same chemical plating as that in Example 5 for the first plating to have a thickness of 15 μm, and then a second Co—Sn plate layer was formed thereover by electric plating using a plating bath comprising 260 g/liter of $NiCl_2.6H_2O$, 14 g/liter of $CoCl_2.6H_2O$ and 15 g/liter of $H_3BO_3$ to have a thickness of 5 μm, the total thickness of the first plate layer and the second plate layer being 20 μm. The thus two-layer plated strip was formed into a tube in the same manner as in Example 1 and then heat-treated at 1200° C. for 5 minutes to produce a welded tube.

This was subjected to the same salt spray test as in Example 1, whereupon no rust formed even after 24 hours. However, as a result of the bending test and evaluation test as applied to the tube, the plate layer peeled off.

COMPARATIVE EXAMPLE 4

A first Ni—P plate layer was formed on a steel strip of the same kind as that used in Example 1 by the same chemical plating as in Example 1 for the first plating to have a thickness of 15 μm, and a second Ni plate layer was formed thereover by the same electric plating as in Example 1 for the second plating to have a thickness of 15 μm, the total thickness of the first plate layer and the second plate layer being 30 μm. The thus two-layer plated strip was formed into a tube in the same manner as in Example 1 and then heat-treated at 850° C. for 15 seconds to produce a welded tube.

This was subjected to the same salt spray test as in Example 1, whereupon no rust formed even after 4 hours. However, as a result of the bending test and evaluation test as applied to the tube, the plate layer cracked and peeled off.

In accordance with the present invention as mentioned above in detail, the inner surface of a welded tube has two plate layers of a first plate layer and a second plate layer of a metal or alloy having a lower melting point of the metal or alloy of the first plate layer. Accordingly, the welded tube of the present invention is free from exposure of the steel base out of the plate layer and is also free from cracks, pin holes, overplated spots and peeling of the plate layer. The welded tube of the invention therefore has excellent corrosion resistance and good workability for working the terminals. The advantages of the present invention are thus noticeable.

While the invention has been described in detail and with reference to specific embodiments thereof, it will be apparent to one skilled in the art that various changes and modifications can be made therein without departing from the spirit and scope thereof.

What is claimed is:

1. A method of producing a welded tube with an excellent corrosion-resistant inner surface, in which a first plate layer of one metal material selected from Sn, Sn—Zn, Sn—Ni, Ni—P and Ni—B is formed on at least one surface of a steel strip, then a second plate layer of one metal material selected from Ni, Co and alloys based on the metals is formed over the first plate layer, and the thus plated steel strip is formed into a tube by welding with the plated surface being inside and then heat-treated.

2. The method of producing a welded tube with an excellent corrosion-resistant inner surface as claimed in claim 1, in which the thickness of the first plate layer is from 0.5 to 10 μm.

3. The method of producing a welded tube with an excellent corrosion-resistant inner surface as claimed in claim 1, in which the thickness of the second plate layer is from 0.5 to 10 μm.

4. The method of producing a welded tube with an excellent corrosion-resistant inner surface as claimed in claim 1, in which the total thickness of the first plate layer and the second plate layer is from 1 to 15 μm.

5. The method of producing a welded tube with an excellent corrosion-resistant inner surface as claimed in claim 1, in which the heat treatment is effected at a temperature falling within the range of from the melting point of the single metal or alloy of forming the first plate layer to 1200° C. for a period of from 5 seconds to 15 minutes.

6. The method of producing a welded tube with an excellent corrosion-resistant inner surface as claimed in claim 5, in which the heat treatment is effected at a temperature of from 800° to 1200° C. for a period of from 10 seconds to 5 minutes.

* * * * *